United States Patent [19]

Sugawara

[11] 4,390,939
[45] Jun. 28, 1983

[54] ELECTRIC POWER SOURCE DEVICE

[75] Inventor: Isao Sugawara, Warabi, Japan

[73] Assignee: Kabushiki Kaisha Chiyoda, Japan

[21] Appl. No.: 281,085

[22] Filed: Jul. 7, 1981

[30] Foreign Application Priority Data

Oct. 14, 1980 [JP] Japan .................................. 55/142387

[51] Int. Cl.³ .......................................... H02M 7/155
[52] U.S. Cl. ..................................... 363/129; 363/87; 323/322; 323/323
[58] Field of Search .................................... 363/63–64, 363/84–88, 128–130, 160–162; 323/241, 244–246, 322–323, 325–326

[56] References Cited

U.S. PATENT DOCUMENTS

| | | | |
|---|---|---|---|
| 3,447,061 | 5/1969 | Russell et al. | 363/87 |
| 3,562,625 | 2/1971 | van den Broek et al. | 363/88 X |
| 3,611,097 | 10/1971 | Joslyn | 363/129 X |
| 3,735,241 | 5/1973 | O'Sullivan | 323/241 |

OTHER PUBLICATIONS

Oliver, "Digitally Controlled Thyristor Current Source", IEEE Transactions on Industrial Electronics and Control Instrumentation, vol. IECI-26, No. 3, Aug. 1979, pp. 185–191.

Primary Examiner—William M. Shoop
Assistant Examiner—Peter S. Wong
Attorney, Agent, or Firm—Leydig, Voit, Osann, Mayer and Holt, Ltd.

[57] ABSTRACT

An electric power source device for electrolytical production or coloring of alumilite, wherein pulses are generated at a predetermined phase of A.C. source, the pulses are frequency-divided by a non-contact circuit and, depending on the results of the frequency division, analogue switches respectively comprising a non-contact circuit are driven to actuate rectifier units for rectifying the A.C. source. Outputs of alternately reversed polarities with distinctly sharp rising and falling are provided.

4 Claims, 4 Drawing Figures (PRIOR ART)

ELECTRIC POWER SOURCE DEVICE

This invention relates to electric power source devices adapted to electrolytical production or coloring of almite.

Generally, alumilite is produced by an electrolysis using aluminum as an anode in an aqueous solution of oxalic acid or chromic acid. It has been known in this connection that, in order to achieve a favorable film thickness or color tone of alumilite, it is necessary to reverse the direct current voltage used in the electrolysis at such comparatively high speed as, for example, 10 to 40 Hz, and the power source device must be adapted to such high speed voltage reversing.

Figure 1:
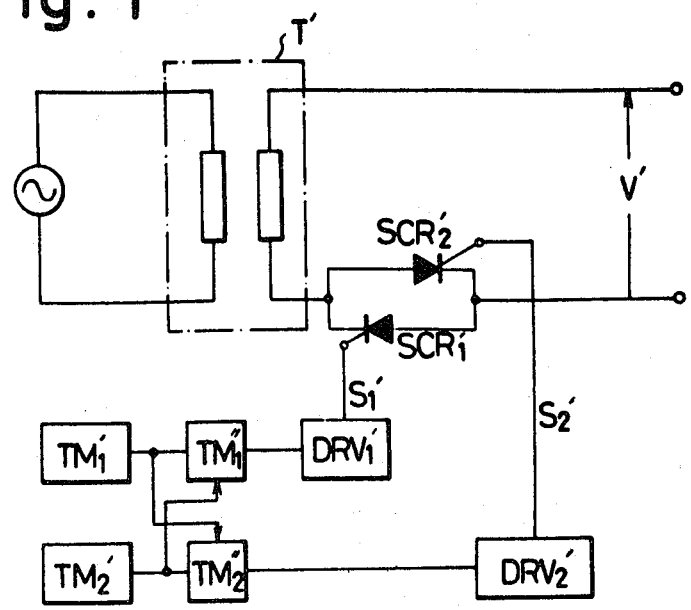
Figure 2:
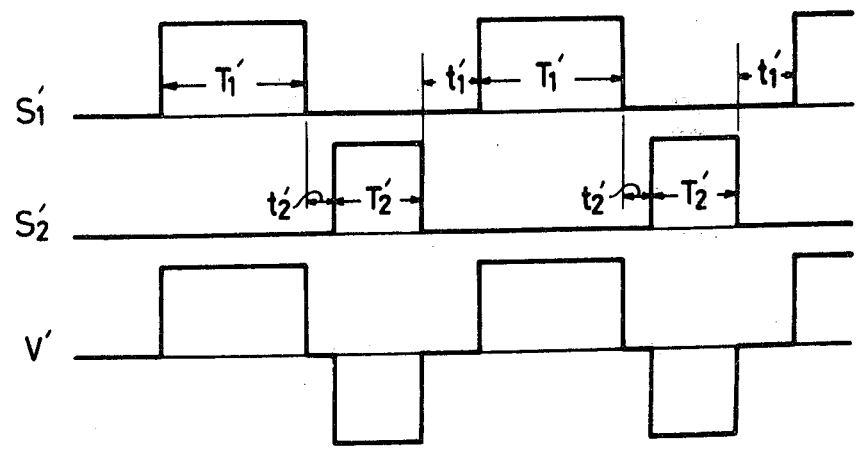

As a conventional electric power source device of the kind referred to, typically such circuit as shown in FIGS. 1 and 2 has been suggested, wherein an output end is formed through a reverse parallel circuit of thyristors $SCR_1'$ and $SCR_2'$ in the secondary winding of a transformer $T'$ of which the primary winding is connected to an alternating current source. These thyristors $SCR_1'$ and $SCR_2'$ are made to alternately conduct responsive to output pulses $S_1'$ and $S_2'$ of respective igniting pulse generating circuits $DRV_1'$ and $DRV_2'$, and high level periods $T_1'$ and $T_2'$ of the output pulses $S_1'$ and $S_2'$ are set respectively by outputs of timers $TM_1'$ and $TM_2'$. A time limiting means $TM_1''$ is inserted between the timer $TM_1'$ and the igniting pulse generating circuit $DRV_1'$ so that, after a falling of the output of the timer $TM_2'$, the output of the timer $TM_1'$ will not be given to the igniting pulse generating circuit $DRV_1'$ during a time $t_1'$. In the same manner, a time limiting means $TM_2''$ is inserted also between the timer $TM_2'$ and the igniting pulse generating circuit $DRV_2'$ so that, after a falling of the output of the timer $TM_1'$, the output of the timer $TM_2'$ will not be given to the igniting pulse generating circuit $DRV_2'$ for a time $t_2'$. With these arrangements, the thyristors $SCR_1'$ and $SCR_2'$ are made to alternately conduct with safety periods of the times $t_1'$ and $t_2'$ interposed and such voltage $V'$ as shown in FIG. 2 is provided out of the output end so as to be an electric power source for the electrolysis.

However, in the conventional device shown in FIG. 1 or the like devices, the timers, time limiting means and the like are of a formation having contacts, so that their function as being an electric power source device has been limited, the trouble rate has been unable to be reduced and the life could not be elongated. Particularly, as the time of turning on and off the thyristors $SCR_1'$ and $SCR_2'$ has been unable to be made shorter beyond the unit of second and thus to be more precise, they have been insufficient to be the power source device for electrolyzing alumilite.

A primary object of the present invention is, therefore, to provide an electric power source device wherein a control circuit having no contact is used for controlling thyristors to reduce the trouble rate and elongate the life of the device.

Another object of the present invention is to provide an electric power source device wherein the turning on and off operations of thyristors are made quicker and more precise so as to generate the optimum voltage for electrolytically producing alumilite.

Figure 3:
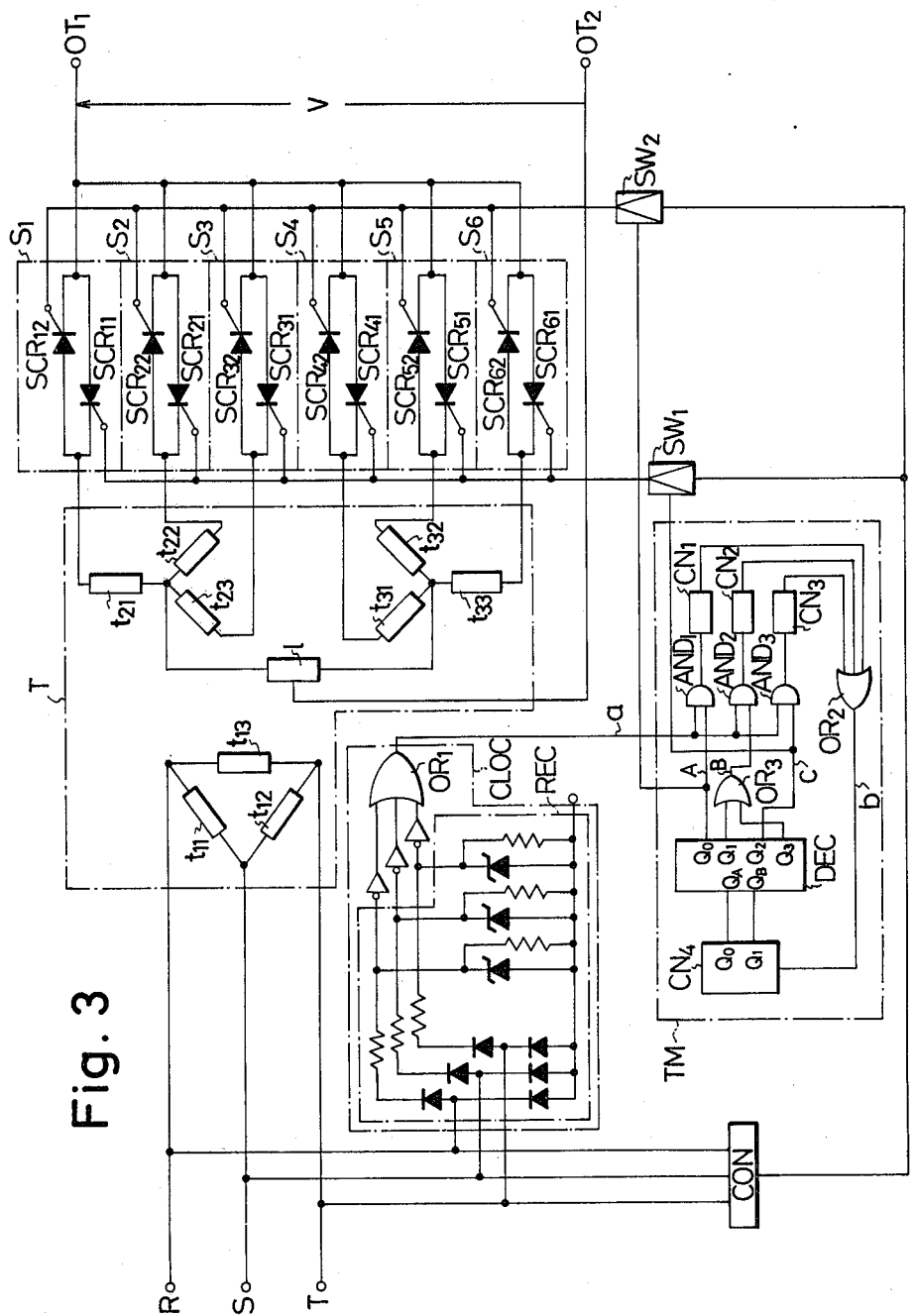
Figure 4:
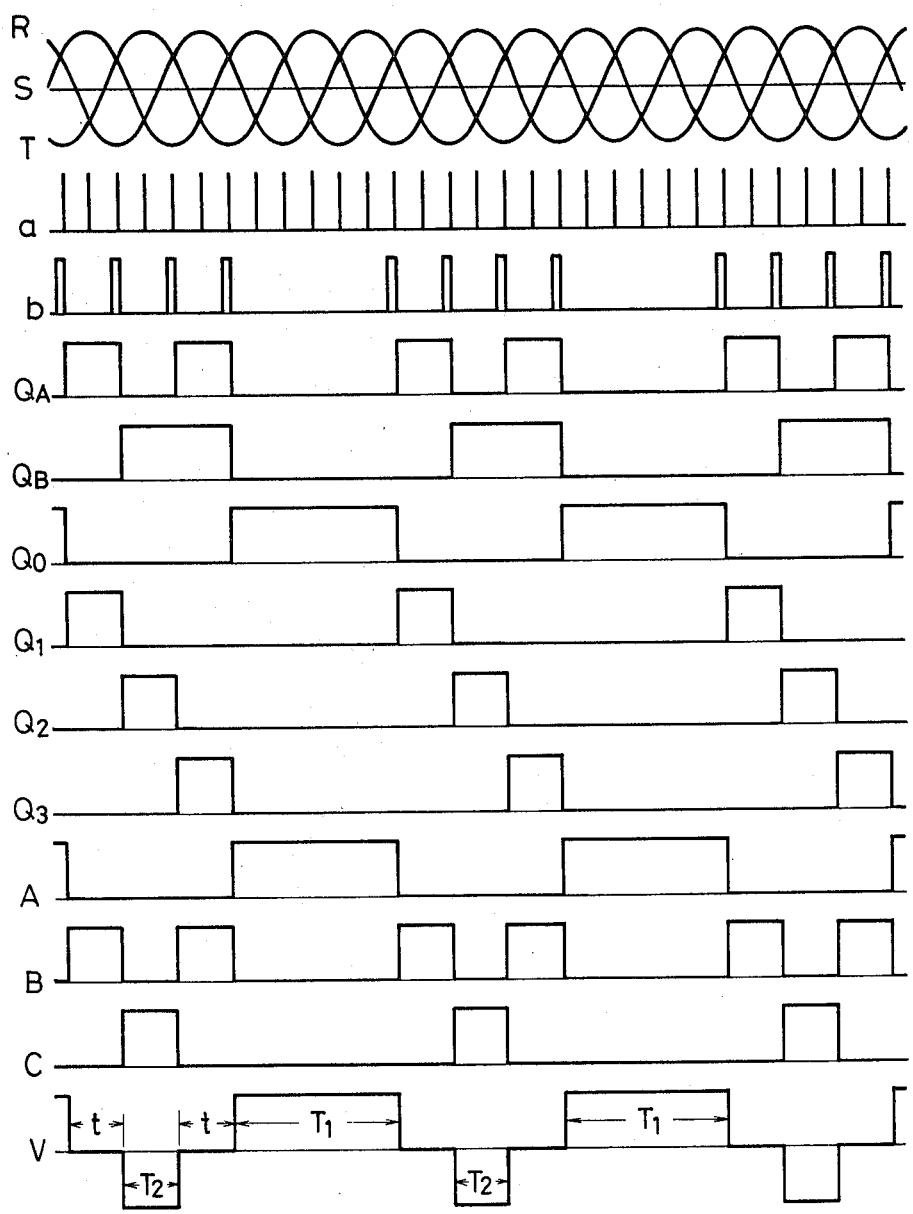

Other objects and advantages of the present invention will be apparent in the light of the following description of the present invention detailed with reference to a preferred embodiment of the invention shown in accompanying drawings, in which:

FIG. 1, labeled PRIOR ART, shows in block diagram an example of conventional electric power source devices;

FIG. 2, labeled PRIOR ART, shows voltage wave forms at respective parts in the device of FIG. 1;

FIG. 3 shows an embodiment of the electric power source device of the present invention; and FIG. 4 shows voltage wave forms at respective parts of the device shown in FIG. 3.

While the present invention shall now be described in the followings with reference to the preferred embodiment shown in the drawings, the intention is not to limit the invention only to the particular embodiment but to rather include all alterations, modifications and equivalent arrangements possible within the technical scope of the appended claims.

Referring now to FIG. 3, there is shown an electric power source device according to the present invention which is to be inserted between a three-phase alternating current source and a device for electrolytically producing alumilite. In the drawing, T is a transformer in which primary windings $t_{11}$, $t_{12}$ and $t_{13}$ are inserted respectively between phases R and S, between phases S and T and between phases T and R. Secondary windings $t_{21}$, $t_{22}$ and $t_{23}$ of the first set of the transformer T are connected at their first end with one another, and the transformer T has a second set of secondary windings $t_{31}$, $t_{32}$ and $t_{33}$ which are also mutually connected at first end to each other. An interphase reactor 1 is inserted between respective junctions of the mutually connected first ends of the two sets of the secondary windings $t_{21}$, $t_{22}$ and $t_{23}$ and $t_{31}$, $t_{32}$ and $t_{33}$. $S_1$ to $S_6$ are rectifying units inserted respectively between second ends of the respective secondary windings $t_{21}$, $t_{22}$, $t_{23}$, $t_{31}$, $t_{32}$ and $t_{33}$ and an output terminal $OT_1$, while another output terminal $OT_2$ is connected to the respective junctions of the first ends of the two sets of the secondary windings $t_{21}$, $t_{22}$ and $t_{23}$ and $t_{31}$, $t_{32}$ and $t_{33}$ respectively through the upper half part and lower half part of the interphase reactor 1. The rectifying units $S_1$ to $S_6$ respectively comprise each of reverse parallel circuits of thyristors $SCR_{11}$ and $SCR_{12}$, $SCR_{21}$ and $SCR_{22}$, $SCR_{31}$ and $SCR_{32}$, $SCR_{41}$ and $SCR_{42}$, $SCR_{51}$ and $SCR_{52}$, and $SCR_{61}$ and $SCR_{62}$.

A clock signal generating circuit CLOC having an OR circuit $OR_1$ is connected at its input ends through reversing circuits respectively to direct current ends of the respective phases of a rectifying circuit REC connected at the alternating current terminals to a three-phase alternating current source. A timer circuit TM including AND circuits $AND_1$, $AND_2$ and $AND_3$ is connected at respective one of input ends to output ends of the OR circuit $OR_1$. An OR circuit $OR_2$ is included in the timer circuit TM and connected at respective input ends to the output ends of the AND circuits $AND_1$, $AND_2$ and $AND_3$ respectively through counters $CN_1$, $CN_2$ and $CN_3$. A two-stage binary counter $CN_4$ is connected to the output end of the OR circuit $OR_2$, a decoder DEC is connected at its input end to the two-stage binary counter $CN_4$, at output end $Q_0$ to the other input end of the AND circuit $AND_1$, at output ends $Q_1$ and $Q_3$ to the other input end of the AND circuit $AND_2$ through an OR circuit $OR_3$ and at output end $Q_2$ to the other input end of the AND circuit $AND_3$.

A phase controlling circuit CON is connected at the input end to the three-phase alternating current source and at the output end to respective gate ends of the thyristors $SCR_{11}$ through $SCR_{61}$ and of the thyristors $SCR_{12}$ through $SCR_{62}$ respectively through each of analogue switches $SW_1$ and $SW_2$ which perform an amplification of received signal and open and close operation. These switches $SW_1$ and $SW_2$ are connected at their controlling ends respectively to the output ends $Q_2$ and $Q_0$ of the decoder DEC.

The function of the power source device according to the present invention shall be explained in the following with reference to FIG. 4. A clock signal a is provided out of the OR circuit $OR_1$ of the clock signal generating circuit CLOC in response to outputs of the respective phases R, S and T of the three-phase alternating current source. The AND circuits $AND_1$, $AND_2$ and $AND_3$ pass the clock signal a and provide it to the counters $CN_1$, $CN_2$ and $CN_3$ during the high level periods of output signals A, B and C from the decoder DEC. The counters $CN_1$, $CN_2$ and $CN_3$ generate pulses respectively at predetermined numbers of pulses of the clock signal a. The pulses thus generated by the counters $CN_1$, $CN_2$ and $CN_3$ are added together by the OR circuit $OR_2$ and are given as a clock signal b to the two-stage binary counter $CN_4$. The outputs from the output ends $Q_0$ and $Q_1$ of the two-stage binary counter $CN_4$ are given respectively to the input ends $Q_A$ and $Q_B$ of the decoder DEC. The signals given to the input ends $Q_A$ and $Q_B$ are indicated as $Q_A$ and $Q_B$ in FIG. 4. In response to these signals $Q_A$ and $Q_B$, such signals $Q_0$, $Q_1$, $Q_2$ and $Q_3$ as in FIG. 4 are provided out of the output ends $Q_0$, $Q_1$, $Q_2$ and $Q_3$ of the decoder DEC. As is evident to persons skilled in the art from FIG. 4 in view of FIG. 3, the decoder DEC is a binary state decoder having two binary inputs $Q_A$, $Q_B$, wherein only the respective output $Q_0$, $Q_1$, $Q_2$, or $Q_3$, corresponding to the binary counter state or value of the binary number specified by the ordered pair ($Q_B$, $Q_A$), is enabled. Hence, in contrast to a decimal counter having ten decoded outputs sequentially counting from 0 to 9 in response to input pulses, the combination of the two-state binary counter $CN_4$ and the binary state decoder DEC functions as a modulo-4 counter having four decoded outputs sequentially counting from 0 to 3 with only the respectove output $Q_0$, $Q_1$, $Q_2$, or $Q_3$ having a logical 1 or enabling output. The signals $Q_1$ and $Q_2$ are added together to be the signal B in the OR circuit $OR_3$ and the signals $Q_0$ and $Q_2$ are directly made to be the signals A and C, respectively. These signals A, B and C are given respectively to the AND circuits $AND_1$, $AND_2$ and $AND_3$ as described above and the timer circuit TM repeats the same operation.

The signals A and B open and close respectively the analogue switches $SW_2$ and $SW_1$ and give the outputs of the phase controlling circuit CON to the rectifying units $S_1$ to $S_6$ in response to the high level periods of the signals A and C. The thyristors $SCR_{11}$, $SCR_{21}$, $SCR_{31}$, $SCR_{41}$, $SCR_{51}$ and $SCR_{61}$ of the rectifying units $S_1$ to $S_6$ are ignited sequentially by the analogue switch $SW_1$ while the thyristors $SCR_{12}$, $SCR_{22}$, $SCR_{32}$, $SCR_{42}$, $SCR_{52}$ and $SCR_{62}$ are ignited sequentially by the other analogue switch $SW_2$. Therefore, the thyristors $SCR_{11}$, $SCR_{21}$, $SCR_{31}$, $SCR_{41}$, $SCR_{51}$ and $SCR_{61}$ are sequentially ignited in response to the high level period of the signal C and the thyristors $SCR_{12}$, $SCR_{22}$, $SCR_{32}$, $SCR_{42}$, $SCR_{52}$ and $SCR_{62}$ are sequentially ignited in response to the high level period of the signal A.

As a result of such sequential firing of the thyristors $SCR_{11}$, $SCR_{21}$, $SCR_{31}$, $SCR_{41}$, $SCR_{51}$ and $SCR_{61}$ as well as $SCR_{12}$, $SCR_{22}$, $SCR_{32}$, $SCR_{42}$, $SCR_{52}$ and $SCR_{62}$, the voltage induced in the secondary windings $t_{21}$, $t_{22}$, $t_{23}$, $t_{31}$, $t_{32}$ and $t_{33}$ of the transformer T having the primary windings $t_{11}$, $t_{12}$ and $t_{13}$ which are connected to the three-phase alternating current source will be provided as an output voltage V out of the output ends $OT_1$ and $OT_2$ through the interphase reactor 1. As shown in FIG. 4, the output voltage V is a voltage of less ripples and alternately different in the polarity for the times $T_1$ and $T_2$ through the safety time t.

While the description has been made with reference to the embodiment in which the pulse falling time point is made a reference, it will be evident that the operation timing may be taken as based on any other type reference.

As will be clear from the foregoings, in the electric power source device of the present invention, the driving circuit of rectifying unit is made to have no contact so that the operation can be made quick and precise and the life can be elongated. Consequently, when the device is utilized in the electrolytic production of alumilite, the polarity reversing can be increased in number and, therefore, a high quality can be attained. In addition, in coloring alumilite, the color tone can be well secured. Further according to the present invention, the rectifying unit can be made small and light.

What is claimed is:

1. An electric power source device in which the secondary windings of a transformer having the primary windings connected to an alternating current source are connected to output ends through reverse parallel circuits of thyristors including at least one thyristor having a first polarity with respect to the output ends and at least one thyristor having a second opposite polarity with respect to the output ends, the device comprising:
   (a) a phase controlling circuit connected to said alternating current source and generating a signal driving said thyristors at a predetermined phase of the alternating current source,
   (b) a plurality of analogue switches inserted between said phase controlling circuit and the thyristors, at least one of said analog switches being connected to the thyristors having the first polarity and at least one other of said analog switches being connected to the thyristors having the second opposite polarity,
   (c) a clock signal generating circuit connected to the alternating current source and generating pulses at a predetermined phase of the alternating current source, and
   (d) a timer circuit connected to said clock signal generating circuit and selectively opening and closing said plurality of analogue switches at a first time interval wherein only the analog switches enabling the thyristors having the first polarity are closed, a second time interval wherein only the analog switches enabling the thyristors having the second reverse polarity are closed, and a third time interval wherein all of the analog switches are open.

2. An electric power source device according to claim 1 wherein said timer circuit comprises:
   (a) a plurality of AND circuits, each having two inputs and receiving at one of their inputs the pulses generated by said clock signal generating circuit, thereby passing the pulses from the respective input to the output of each AND circuit only when the other respective enabling input of the respective AND circuit is enabled, (b) a plurality of counters having inputs respectively connected to the outputs of said plurality of AND circuits and providing output signals whenever they receive a predetermined number of pulses on their respective inputs, and (c) a decoder having at least two inputs responsive to the outputs of said plurality of counters and producing signals for opening and closing said plurality of analogue switches and also producing signals applied to said other enabling inputs of the AND circuits.

3. An electric power source device according to claim 2 wherein said timer circuit further comprises:

(a) an OR circuit having inputs receiving said outputs of said plurality of counters, and (c) a two-stage binary counter connected to the output of said OR circuit, the outputs of the two-stage binary counter being connected to the inputs of said decoder.

4. An electric power source device according to claim 3 wherein said plurality of counters includes at least three counters and said plurality of AND circuits includes at least three AND circuits, and wherein said decoder is a binary state decoder having first, second, third, and fourth outputs decoding the respective state of the two-stage binary counter, the first decoder output being connected to the control inputs of said analog switches enabling the thyristors having said first polarity with respect to the output ends and also being connected to the other enabling input of a first one of said AND circuits, the other enabling input of a second one of said AND circuits being responsive to the logical OR of the second and third decoder outputs, and the fourth decoder output being connected to the control inputs of said analog switches enabling the thyristors having said second opposite polarity with respect to the output ends and also being connected to the other enabling input of a third one of said AND circuits, so that the counter receiving pulses from the first AND circuit specifies the number of pulses during which the first polarity voltage is applied to the output ends, the counter receiving pulses from the third AND circuit specifies the number of pulses during which the second opposite polarity voltage is applied to the output ends and the counter receiving pulses from the second AND circuit specifies the number of pulses during a safety time for which no output voltage is applied to the output ends.

* * * * *